US006308804B1

(12) United States Patent
Roberts

(10) Patent No.: US 6,308,804 B1
(45) Date of Patent: Oct. 30, 2001

(54) QUICK CONNECT WHEELCHAIR BRAKE LOCK

(76) Inventor: Jack E. Roberts, Rte. 1, Box 28, Lewis, KS (US) 67552-9541

( * ) Notice: Subject to any disclaimer, the term of this patent is extended or adjusted under 35 U.S.C. 154(b) by 0 days.

(21) Appl. No.: 09/523,943

(22) Filed: Mar. 13, 2000

(51) Int. Cl.[7] ....................................... B60T 1/00
(52) U.S. Cl. .......................... 188/2 F; 188/2 D; 188/31; 74/501.6; 74/502.2; 74/107
(58) Field of Search ................... 188/2 F, 19, 20, 188/21, 2 D, 31, 69; 280/250.1, 304.1; 74/501.6, 502.2, 107

(56) References Cited

U.S. PATENT DOCUMENTS

| 1,331,513 | * | 2/1920 | Lindberg | 188/20 |
| 1,709,527 | * | 4/1929 | Ford | 188/20 |
| 3,174,768 | * | 3/1965 | Sanders et al. | 280/33.99 |
| 4,084,663 | * | 4/1978 | Haley | 188/31 |
| 4,480,720 | * | 11/1984 | Shimano | 188/24.15 |
| 4,733,755 | * | 3/1988 | Manning | 188/2 F |
| 5,492,355 | * | 2/1996 | Berry | 280/304.1 |
| 5,799,756 | * | 9/1998 | Roberts et al. | 188/2 F |
| 6,170,615 | * | 1/2001 | Cheng | 188/20 |
| 6,250,433 | * | 6/2001 | Sealine et al. | 188/69 |

* cited by examiner

Primary Examiner—Robert Oberleitner
Assistant Examiner—Bradley King

(57) ABSTRACT

A quick connect-disconnect brake hub lock system is disclosed. The locking mechanism is attached to camber tubes of varying degrees of 0° to 12° with wheels that move in and out from the centerline of the wheelchair. Such system of locking must be quick disconnected and reconnected to adapt to the various camber tubes that have varying degrees of angles. Not only do the camber tubes adjust the caster and camber of the wheels, but are adjusted for wheelbase width The brake hub locking mechanism must move with these elements and have the capacity to lock the wheels at whatever position the wheels are in. The sliding mechanism in the handle is completely enclosed to prohibit dirt, which wears such elements quickly. The rotary cam mechanism sliding against the rectangular slider provides the means of pulling the cables straight thus eliminating breaking and thereby locking or unlocking the wheels of the wheelchair.

2 Claims, 4 Drawing Sheets

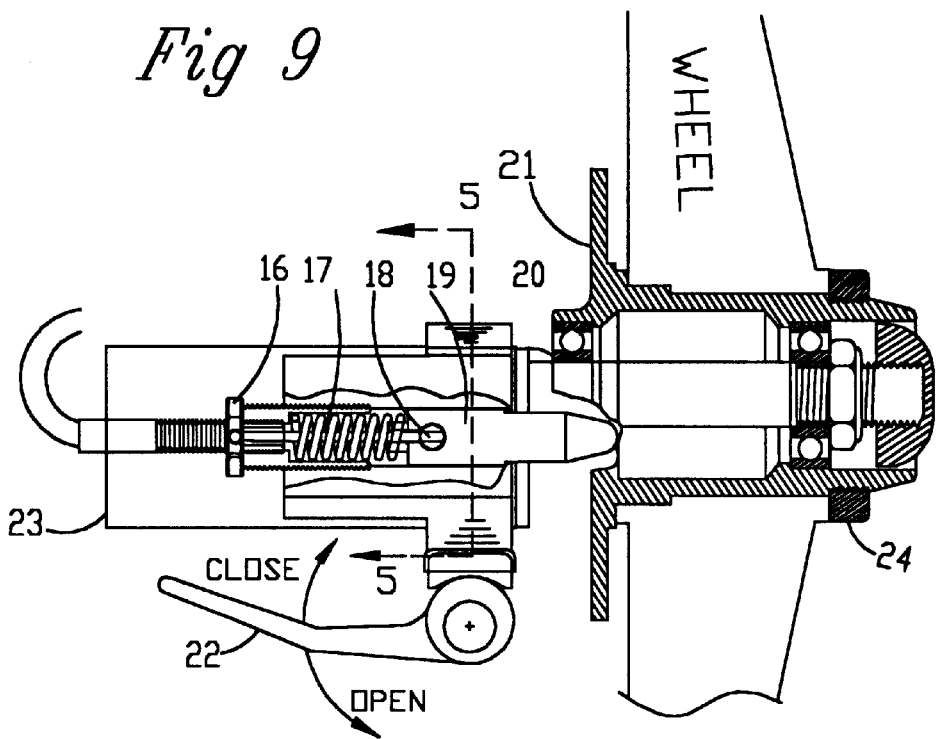
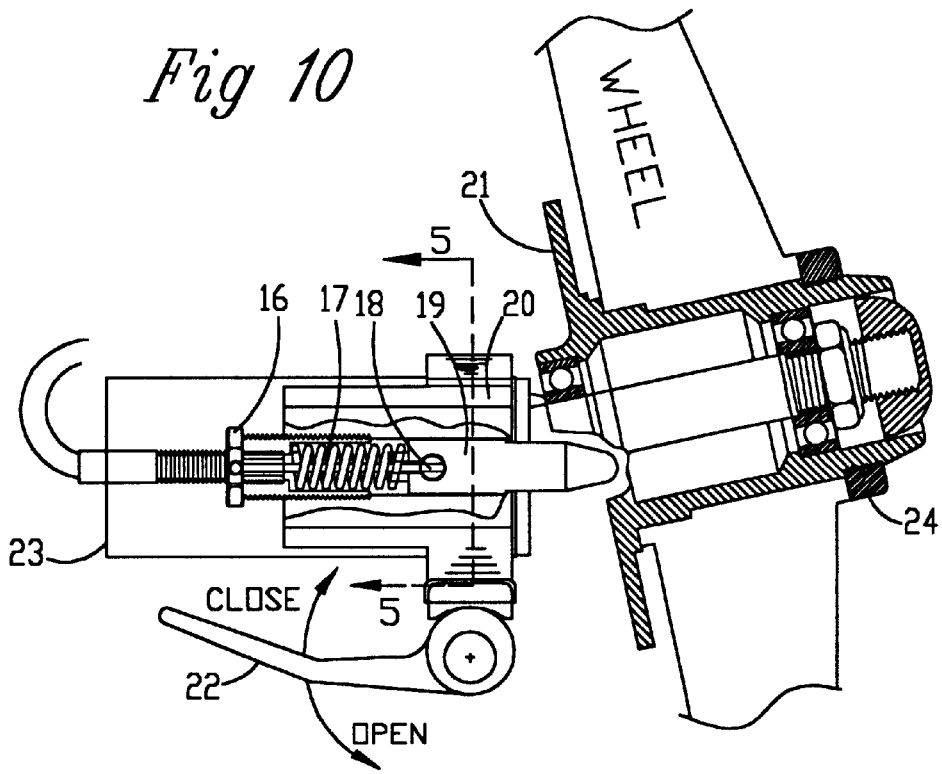

ID WHEELCHAIR BRAKE
QUICK CONNECT WHEELCHAIR BRAKE LOCK

New wheelchairs are having features installed that make it imperative to have an improved braking and wheel locking systems to keep the wheelchair operator where he wants to be without slipping or sliding. Some wheelchairs have floating axles that makes it impossible for the original equipment to keep the operator where he wants to be because the change in relationship of the axle to the frame of the wheelchair where the original equipment braking system is attached. This constant change makes it impossible for the braking system to keep up with the change between the floating axle and the wheelchair frame. This constant movement is caused whenever the person in the wheelchair hits a bump or moves from his car into his wheelchair. Additionally when the tires get low on air, they slip. When the tires get wet, they slip and slide. Some who are confined to a wheelchair want to play sports and desire to have a wider stance to the wheels of their wheelchair as well as having adjustable caster and camber angles to their wheels. One wheelchair manufacturer produces a wheelchair with tubes, called camber tubes that slide in and out from the centerline of the wheelchair to give a wider position to the wheels. They produce four camber tubes with various degrees of camber namely, 0° and 3°; 3° and 6°; 6° and 9°; then the fourth is 9° and 12°. When these tubes are changes on the wheelchair, the method of braking or locking the wheelchair must also be quickly changed as well as compensate and adjust to the various camber angles and position from the center-line of the wheelchair. This is why the Quick Connect Wheelchair Hub Lock was developed. It provides the means of locking the hubs of the wheels of the wheelchair anywhere from 0° degrees to 12° and follows the wheels as they move thereby stopping the wheelchair in a quick and positive manner.

Camber is the degrees that the wheels are inclined inward at the top and are measured in degrees from perpendicular. Changing tubes that slide in and out from the centerline of the wheelchair change the camber angles and permit a wider baseline for the wheels of the wheelchair. Tubes currently manufactured by wheelchair manufacturer are 0°–3°;30°–60°;6°–9° and 90°–12°. In order for the occupant of the wheelchair to change these tubes and have some brake or locking mechanism, be must quickly be able to disconnect the locks and attach them to the other tubes that have the various camber angles for the wheels. With cam-handle clamps the quick-connect wheelchair hub lock makes this possible. No toolbox is needed in order to make any adjustments. With each new camber tube, the tapered pin that enters the hole of the disc on the wheel automatically adjusts to the new angle.

BACKGROUND OF INVENTION

This invention being presented is a necessary means of locking wheelchair wheels with adjustable camber angles to their wheels in a stationary position as desired by the occupant of the wheelchair. The brake lock can be easily removed or attached to the wheelchair as well as adjusted for the variations in the camber tube axle.

The improvements of the present invention gives a positive breaking system that compensates for the various caster-camber angles. The prior arts brake devices do not have this capability.

The prior arts being referenced here:

| Inventors | Patent Number | Date issued |
| --- | --- | --- |
| Watwood, Brian | 6,007,082 | 12/28/99 |
| Duran, Brian M. | 6,012,555 | 1/11/2000 |
| Pfister, Berard | 5,034,039 | 9/13/94 |
| Roberts; Jack | 5,799,756 | 9/1/98 |
| Barry; Theodore | 5,280,938 | 1/25/94 |
| Babilias; John | 4,623,043 | 11/18/86 |

None of the prior arts have the capacity or ability to adjust the locking mechanism to wheels that change their distance from the centerline of the wheelchair as well as change the angles of their caster and camber on the wheels. Surelock's claim of adjustability in U.S. Pat. No. 5,799,756 can be adjusted to a limited degree in and out from centerline, but not when adjusting for the camber, it slips out of engagement with the notched disc, nor does it have the ability to move the latch mechanism with the camber tubes as required in the Quick Connect Brake Lock. Additionally the latching mechanism does not have the ability to hold the wheels in the desired position as does the angled pin and hole combination of the Quick Connect Brake Lock when coping with the various degrees of camber angle. The Quick-Connect-Disconnect Wheelchair Brake Lock described herein handles these variables having to do with the location of the wheels as well as the angle of the wheels. Not only does it have the ability to adjust to these variables, but has the ability to be quickly removed and reconnected to new tubes, which introduce new camber angles to the wheels and wheel locations. The handle for activating the locking mechanism is completely enclosed to keep sand and gravel and snow and ice from collecting in the moving parts of the handle, which would cause excessive wear and interference with the movement of the locking mechanism. The handle is designed to improve the ease of operation.

BRIEF DESCRIPTION OF THE DRAWINGS

FIG. 9 shows the wheelchair wheel set to zero degrees.

FIG. 10 shows the wheelchair wheel set to 12°.

DETAILED DESCRIPTION OF THE INVENTION

Figure 1:
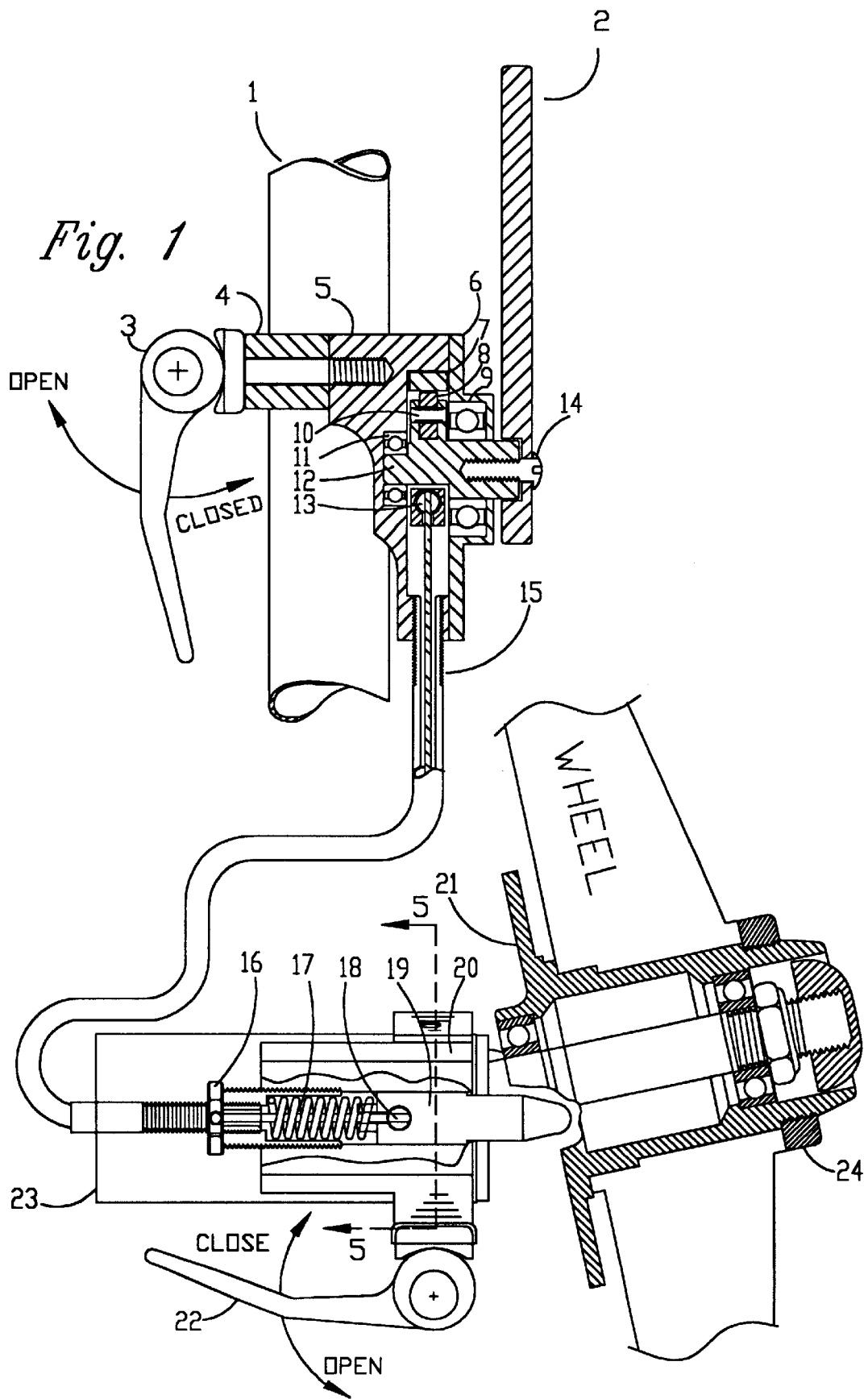
FIG. 1 shows the complete assembly with the handle.
Figure 2:
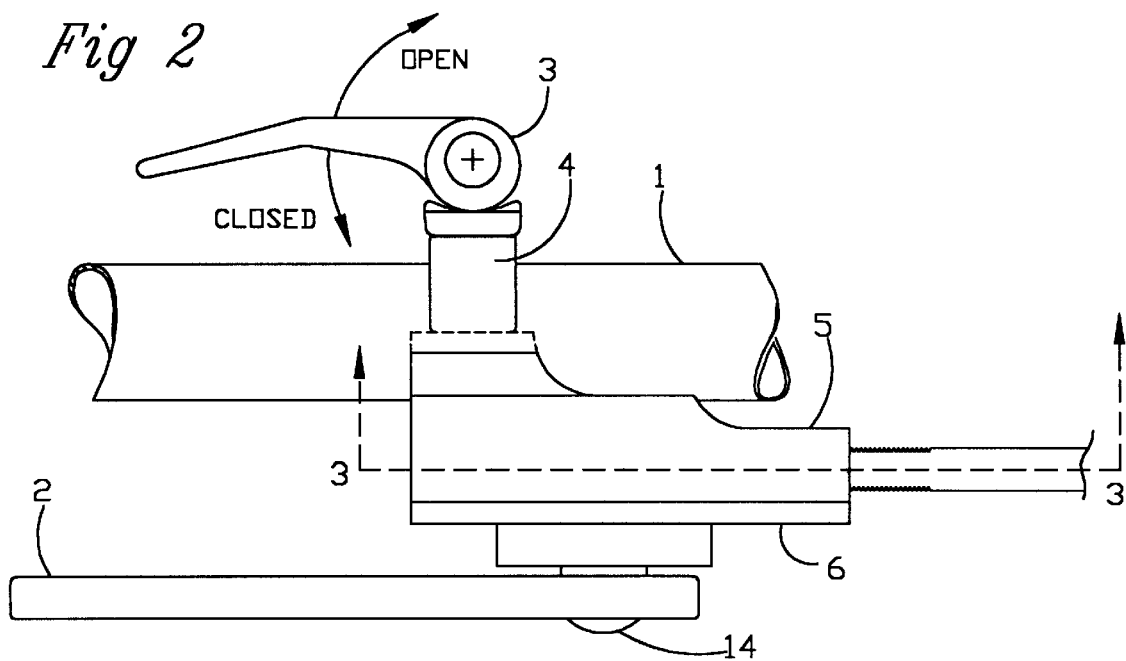
FIG. 2 shows a top view with the quick-locking mechanism on left-hand side of the wheelchair.
Figure 3:
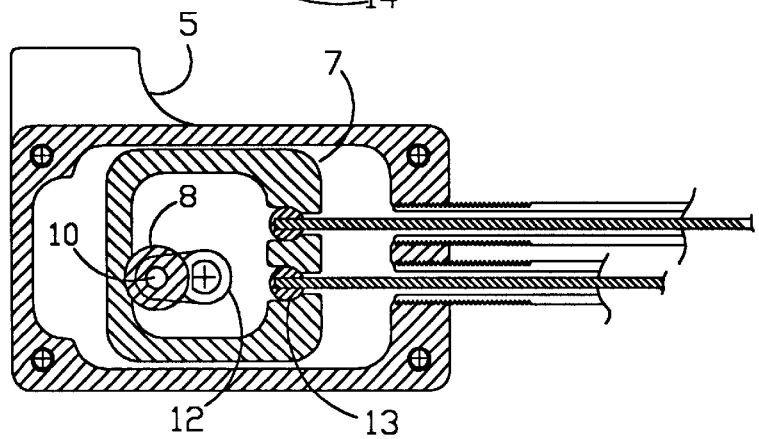
FIG. 3 is a cross-section of the handle housing showing the slide roller cam mechanism.
Figure 4:
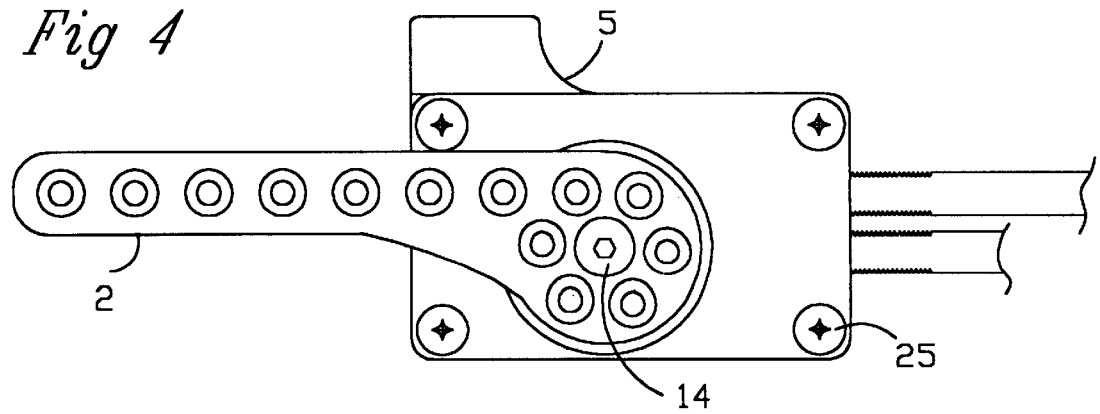
FIG. 4 shows side view of handle in the unlocked position.

In FIG. 1 the cam-actuated-slide mechanism is mounted to wheelchair frame (1) by means of clamp (3) and clamp bracket (4) and housing (5) providing the other half of clamp bracket. (6) is a cover plate with beating (9) that mounts to handle housing (5) with screws shown in FIG. 4 (25) which provides protection from dirt and gravel that is picket up by the wheels of the wheelchair. (8) is a hardened steel roller attached to rotating cam (12) with hardened steel pin (10). The rotating cam (12) rotates with its centerline moving through the center of bearing (11) and beat (9). Handle (2) is attached to rotating cam by means of screw (14). The hardened steel roller (8) rolls against rectangular slide mechanism (7). The rectangular slide (7) has two holes, which allows for two cables (15) to be attached to it by means of circular balls (13) which permits easy attachment or replacement of the cables. Or one cable for independent wheel operation. The cable by means of ball (18) retracts tapered pin against spring (17) when handle (2) is in the forward position. When handle (2) is in the up position spring (17) by means of it's tension causes the tapered pin to enter into chamfered hole of disc (21). Camber tube (23) is moved in and out from the centerline of the wheelchair. (24) is the locking nut that holds the wheel hub and locking disc into the wheelchair wheel.

Figure 5:
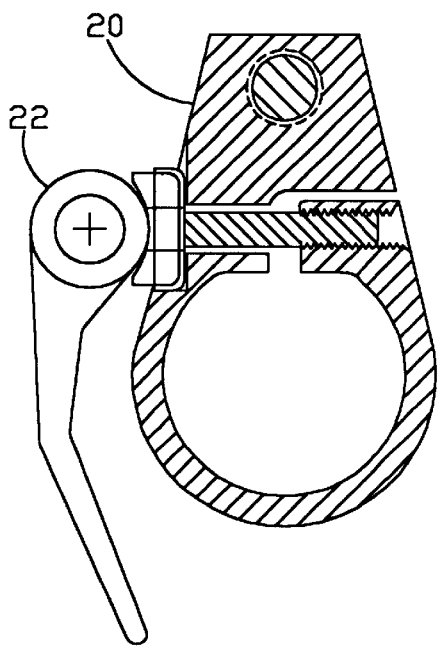
FIG. 5 shows lock pin housing cross-section with quick lock clamping mechanism.
Figure 6:
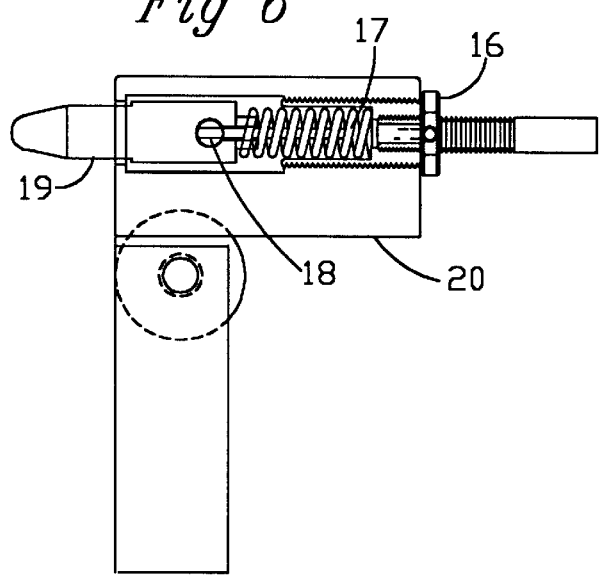
FIG. 6 shows side view of pin block with clamp and lock pin.
Figure 7:
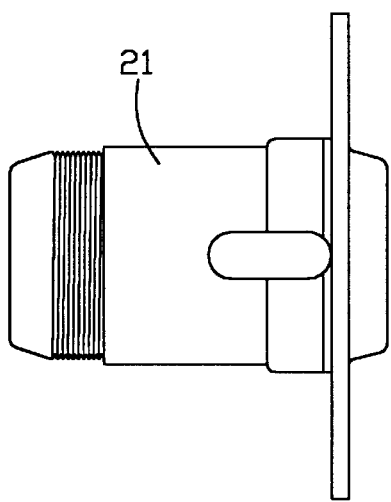
FIG. 7.shows wheel hub and disc combination.
Figure 8:
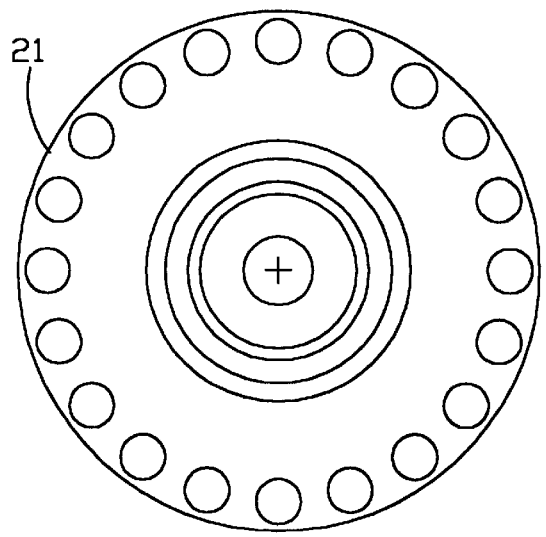
FIG. 8 shows end-view of hub and disc combination with holes that receive the latch pin of FIG. 6.

When the operator of the wheelchair desires to lock the chair in his desired position, he simply pulls up on the handle (2) and the spring tension against pin (19) and housing (16) cause the handle to stay in the locked position until the occupant returns the handle (2) and roller (8) into the detent in rectangular slide (7). FIG. 5 shows cross-sections of quick connect and disconnect pin holder. Cam handle (22) exerts force against pin housing (20) which causes opposite side with threads to be pulled tight around the camber tube which has the same configuration as the large inside diameter of FIG. 5. By providing a taper to pin (19) and some to holes shown in (21) it permits the wheels to be adjusted 0° to 12° of camber and the locks work well for all positions in between. The quick release clamp also permits adjustment between pin (19) in FIG. 6 and the holes in (21) shown in FIG. 8. FIG. 9 shows the wheel set at 0°-camber angle and FIG. 10 shows the wheel set at 12° camber angle.

What I claim as my invention is:

1. A quick connect hub lock system for both wheels of a wheelchair comprising;

a disc with chamfered holes mounted to the wheels of a wheelchair, a conical shaped actuator pin received in a pin housing, a spring received in said pin housing for biasing said conical actuator pin, a quick release clamp for mounting said pin housing to a camber tube of the wheelchair, a cam-actuated-slide mechanism attached to the wheelchair frame, wherein said cam-actuated-slide mechanism comprises a rectangular slide and a rolling cam, said rolling cam engaging said rectangular slide, wherein said rectangular slide is connected to said conical actuator pin by a cable, wherein said spring causes said conical actuator pin to be received in said chamfered holes, locking the hub lock system, wherein operation of said cam-actuated-slide mechanism causes said conical actuator pin to be removed from said chamfered disc against said spring, unlocking the hub lock system, wherein said conical actuator pin and said chamfered holes allow camber angles from 0° to 12° to be used.

2. A quick connect hub lock system according to claim 1, further comprising;

a handle connected to said rolling cam, a circular groove across one side of said rectangular slide to cause said hub lock system to stay locked until said handle is operated.

* * * * *